(12) United States Patent
Codrescu et al.

(10) Patent No.: US 7,657,791 B2
(45) Date of Patent: Feb. 2, 2010

(54) METHOD AND SYSTEM FOR A DIGITAL SIGNAL PROCESSOR DEBUGGING DURING POWER TRANSITIONS

(75) Inventors: Lucian Codrescu, Austin, TX (US); William C. Anderson, Austin, TX (US); Suresh Venkumahanti, Austin, TX (US); Louis Achille Giannini, San Diego, CA (US); Manojkumar Pyla, San Diego, CA (US); Xufeng Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 11/560,323

(22) Filed: Nov. 15, 2006

(65) Prior Publication Data

US 2008/0115145 A1    May 15, 2008

(51) Int. Cl.
*G06F 11/00* (2006.01)
(52) U.S. Cl. .......................................... 714/30; 714/31
(58) Field of Classification Search ................... 714/30, 714/31, 34, 37
See application file for complete search history.

(56) References Cited

U.S. PATENT DOCUMENTS

| | | | |
|---|---|---|---|
| 4,080,650 A | 3/1978 | Beckett | |
| 4,669,059 A * | 5/1987 | Little et al. | ............... 713/330 |
| 4,901,307 A | 2/1990 | Gilhousen et al. | |
| 5,103,459 A | 4/1992 | Gilhousen et al. | |
| 5,136,717 A | 8/1992 | Morley et al. | |
| 5,544,311 A | 8/1996 | Harenberg et al. | |
| 5,551,043 A | 8/1996 | Crump et al. | |
| 5,951,696 A | 9/1999 | Naaseh et al. | |
| 6,029,248 A | 2/2000 | Clee et al. | |
| 6,202,172 B1 * | 3/2001 | Ponte | ........................ 714/31 |
| 6,226,749 B1 | 5/2001 | Carloganu et al. | |
| 6,314,530 B1 * | 11/2001 | Mann | ........................ 714/38 |

(Continued)

FOREIGN PATENT DOCUMENTS

WO    0118651    3/2001

OTHER PUBLICATIONS

Hartvigsen, J., et al.; "Juag/Debug Interface"; Motorola Technical Developments, Motorola Inc., Schaumburg, Illinois, US; vol. 19, Jun. 1, 1993; pp. 107-109.

(Continued)

*Primary Examiner*—Marc Duncan
(74) *Attorney, Agent, or Firm*—Peter M. Kamarchik; Nicholas J. Pauley; Sam Talpalatsky

(57) ABSTRACT

Techniques for the design and use of a digital signal processor, including (but not limited to) for processing transmissions in a communications (e.g., CDMA) system. A method and system control transferring data between debugging registers and digital signal processor processes in association with a power transition sequence of the digital signal processor. In a digital signal processor, debugging registers associate with the core processor process and the debugging process. Control bits control transferring data among the debugging registers, the core processor process and the debugging process. The control bit prevents transferring data among the debugging registers, the core processor process and the debugging process in the event of a power transition sequence. Control bits also prevent a power transition sequence of the digital signal processor in the event of transferring data among the debugging registers and the core processor process or the debugging process.

32 Claims, 8 Drawing Sheets

U.S. PATENT DOCUMENTS

| | | | |
|---|---|---|---|
| 6,467,054 B1 * | 10/2002 | Lenny | 714/42 |
| 6,480,818 B1 | 11/2002 | Alverson et al. | |
| 6,532,553 B1 | 3/2003 | Gwilt et al. | |
| 6,665,802 B1 * | 12/2003 | Ober | 713/320 |
| 6,684,348 B1 | 1/2004 | Edwards et al. | |
| 6,708,270 B1 * | 3/2004 | Mayer | 713/1 |
| 6,757,829 B1 | 6/2004 | Laczko et al. | |
| 6,832,334 B2 | 12/2004 | Wojcieszak et al. | |
| 6,834,360 B2 | 12/2004 | Corti et al. | |
| 7,020,871 B2 | 3/2006 | Bernstein et al. | |
| 7,073,059 B2 | 7/2006 | Worely et al. | |
| 7,210,064 B2 * | 4/2007 | Mayer | 714/30 |
| 7,222,262 B2 | 5/2007 | Prasadh et al. | |
| 7,254,716 B1 | 8/2007 | Giles et al. | |
| 7,321,957 B2 | 1/2008 | Khan et al. | |
| 7,370,210 B2 | 5/2008 | Symes | |
| 7,383,537 B2 | 6/2008 | Darweesh et al. | |
| 7,383,540 B2 | 6/2008 | Kalra | |
| 7,437,619 B2 | 10/2008 | McCullough et al. | |
| 7,461,407 B2 | 12/2008 | Little et al. | |
| 2002/0065646 A1 | 5/2002 | Waldie et al. | |
| 2003/0014643 A1 | 1/2003 | Asami et al. | |
| 2003/0037225 A1 * | 2/2003 | Deng et al. | 712/227 |
| 2003/0135720 A1 | 7/2003 | DeWitt, Jr. et al. | |
| 2005/0268168 A1 * | 12/2005 | Ishihara | 714/30 |
| 2006/0248394 A1 * | 11/2006 | McGowan | 714/30 |
| 2006/0248395 A1 * | 11/2006 | McGowan | 714/30 |
| 2006/0253894 A1 | 11/2006 | Bookman et al. | |
| 2006/0279439 A1 * | 12/2006 | Swoboda | 341/60 |
| 2007/0016959 A1 | 1/2007 | Ikeda et al. | |
| 2007/0271461 A1 | 11/2007 | Hardy et al. | |
| 2008/0288808 A1 * | 11/2008 | Moyer | 714/2 |

OTHER PUBLICATIONS

"Processor-Controlled Battery Back-Up Power Supply Architecture" IBM Technical Disclosure Bulletin, IBM Corp. New York, US, vol. 31, No. 3, (Aug. 1, 1988), pp. 183-185, XP000119002, ISSN: 0018-8689.

"Technique for Power Management in Signal Processors" IBM Technical Disclosure Bulletin, IBM Corp. New York, US, vol. 35, No. 5, (Oct. 1, 1992), pp. 425-427, XP000313036.

International Search Report-PCT/US07/084523, International Search Authority-European Patent Office-8-4-09.

Written Opinion-PCT/US07/084523, International Search Authority-European Patent Office-8-4-09.

* cited by examiner

METHOD AND SYSTEM FOR A DIGITAL SIGNAL PROCESSOR DEBUGGING DURING POWER TRANSITIONS

RELATED APPLICATIONS

This application is related to the following co-pending U.S. Patent application numbers: application Ser. No. 11/560,217, filed Nov. 15, 2006, entitled NON-INTRUSIVE, THREAD-SELECTIVE, DEBUGGING METHOD AND SYSTEM FOR A MULTI-THREADED DIGITAL SIGNAL PROCESSOR; U.S. patent application Ser. No. 11/560,332, filed Nov. 15, 2006, entitled METHOD AND SYSTEM FOR TRUSTED/UNTRUSTED DIGITAL SIGNAL PROCESSOR DEBUGGING OPERATIONS; U.S. patent application Ser. No. 11/560,339, filed Nov. 15, 2006, entitled EMBEDDED TRACE MACROCELL FOR ENHANCED DIGITAL SIGNAL PROCESSOR DEBUGGING OPERATIONS; and U.S. patent application Ser. No. 11/560,344, filed Nov. 15, 2006, entitled METHOD AND SYSTEM FOR INSTRUCTION STUFFING OPERATIONS DURING NON-INTRUSIVE DIGITAL SIGNAL PROCESSOR DEBUGGING.

FIELD

The disclosed subject matter relates to data processing systems and processes, such as may find use in data communications and similar applications. More particularly, this disclosure relates to a novel and improved method and system for controlling debugging operations during digital signal processor power transitions.

DESCRIPTION OF THE RELATED ART

Increasingly, telecommunications and other types of electronic equipment and supporting video, complex audio, videoconferencing and other rich software applications involve signal processing. Signal processing requires fast mathematical calculations and data generation in complex, but repetitive algorithms. Many applications require computations in real-time, i.e., the signal is a continuous function of time, which must be sampled and converted to digital signals for numerical processing. The processor must execute algorithms performing discrete computations on the samples as they arrive.

The architecture of a digital signal processor (DSP) is optimized to handle such algorithms. The characteristics of a good signal processing engine include fast, flexible arithmetic computation units, unconstrained data flow to and from the computation units, extended precision and dynamic range in the computation units, dual address generators, efficient program sequencing, and ease of programming.

One promising application of DSP technology includes communications systems such as a code division multiple access (CDMA) system that supports voice and data communications, as well as text messaging and other applications, between users over a satellite or terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more standards. One such first generation standard is the "TIA/EIA/IS-95 Terminal-Base Station Compatibility Standard for Dual-Mode Wideband Spread Spectrum Cellular System," hereinafter referred to as the IS-95 standard. The IS-95 CDMA systems are able to transmit voice data and packet data. A newer generation standard that may more efficiently transmit packet data is offered by a consortium named the "$3^{rd}$ Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA Standard.

Complex DSP operational software employing the W-DCMA Standard, for example, requires robust development tools. Such development tools may include those for code generation, integration, testing, debugging, and evaluating application performance. In developing and operating software or complex DSP applications, such as advanced telecommunications, applications, there is the need for sophisticated, yet non-intrusive debugging software. That is, debugging software applications must be not only sufficiently robust to monitor, test, and support the correction of software defects and operational problems, but also they may operate so as not to interfere with the core processor software during debugging operations. Otherwise, any problems in the core processing software may hot be detected or detected properly during the use of such debugging software.

One aspect of such, debugging operations relates to their ability to occur dynamically. However, this ability must take into consideration that a device, such as a wireless handset employing a DSP performing debugging operations, must conserve power. To conserve power, frequently the DSP may automatically turn off or shift to an idle operational mode. In addition, when a boot of the processor occurs following an off or idle state, further operational changes in the DSP may occur. In particular, registers containing data relevant to debugging operations may change dynamically during debugging operations. In the event that a power transition occurs, data register reading and/or writing operations may be adversely affected.

Accordingly, there is a need for a method and system that accommodates the complex and sometimes conflicting demands of non-intrusive DSP debugging and power conservation in a DSP, such as wireless handset or portable electronic device DSP.

There is a further need for a method and system that may operate in a multi-threaded DSP for non-intrusive debugging processes for single and selective multiple-thread debugging operations, while also providing for preserving debugging configuration register data during power collapse or other power transitions.

SUMMARY

Techniques for controlling debugging operations during digital signal processor power transitions in a digital signal processor, including a multi-threaded digital signal processor, are disclosed, which techniques improve both the operation of a digital signal processor and the efficient use of digital signal processor instructions for increasingly robust software applications, including applications operating in personal computers, personal digital assistants, wireless handsets, and similar electronic devices, as well as increasing the associated digital processor speed and service quality.

According to one aspect of the disclosed subject matter, a method and system control transferring data between debugging registers and digital signal processor processes in association with a power transition sequence of the digital signal processor. In a digital signal processor operating a core processor process within a core processor and a debugging process within a debugging mechanism, the present disclosure associates debugging registers with the core processor process and the debugging process. By establishing at least one register control bit for controlling the transfer of data among the debugging registers, the core processor process and the debugging process, the method and system set the control bit to a prevent-transfer value that prevents transferring data among the debugging registers, the core processor process and the debugging process in the event of a power transition sequence. By setting the one control bit to prevent a prevent-power-transition value, the present disclosure prevents a power transition sequence of the digital signal processor in the event of transferring data among the debugging registers and the core processor process or the debugging process.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter may become more apparent from the detailed description set forth below when taken in conjunction with the drawings in which like reference characters identify correspondingly throughout and wherein.

Figure 3:
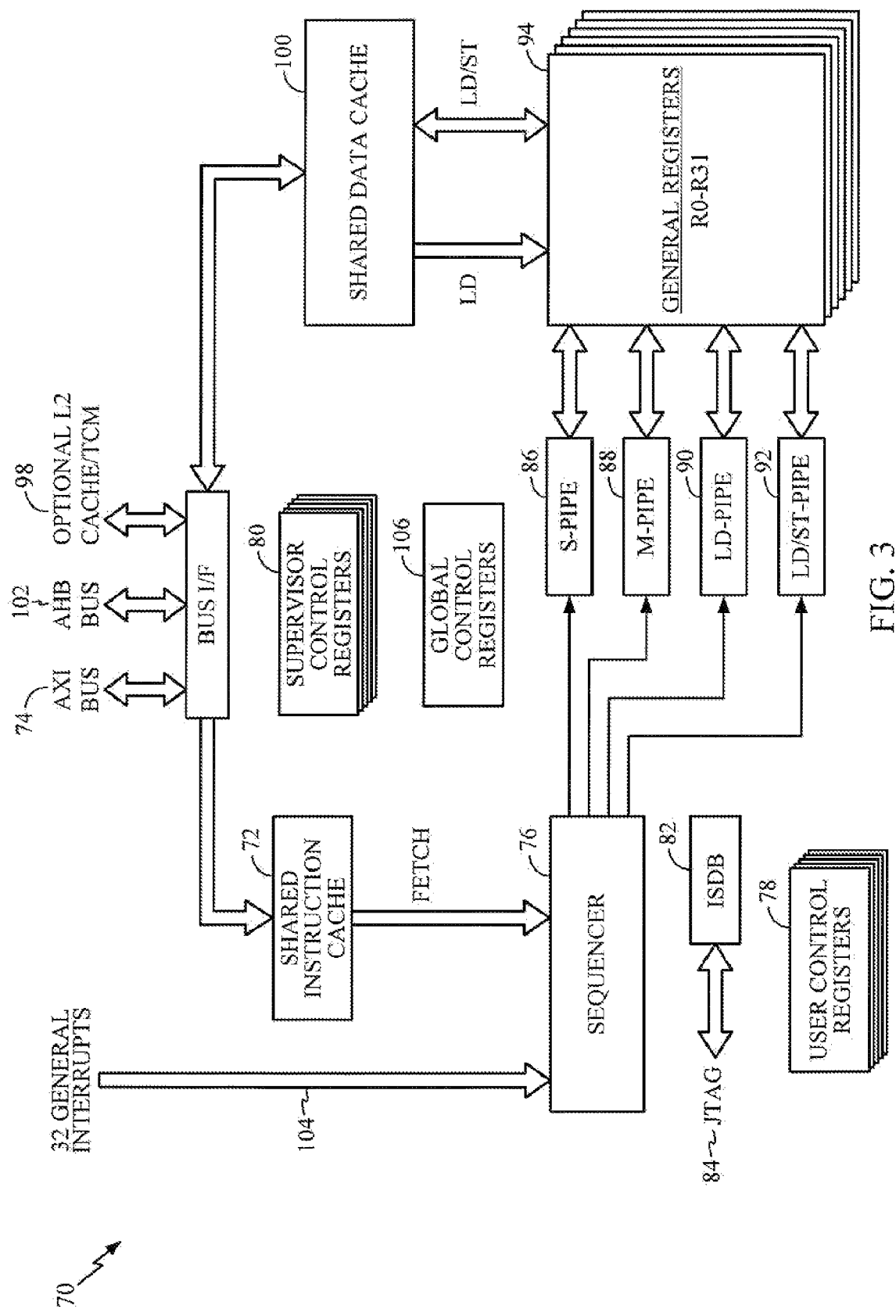
Figure 4:
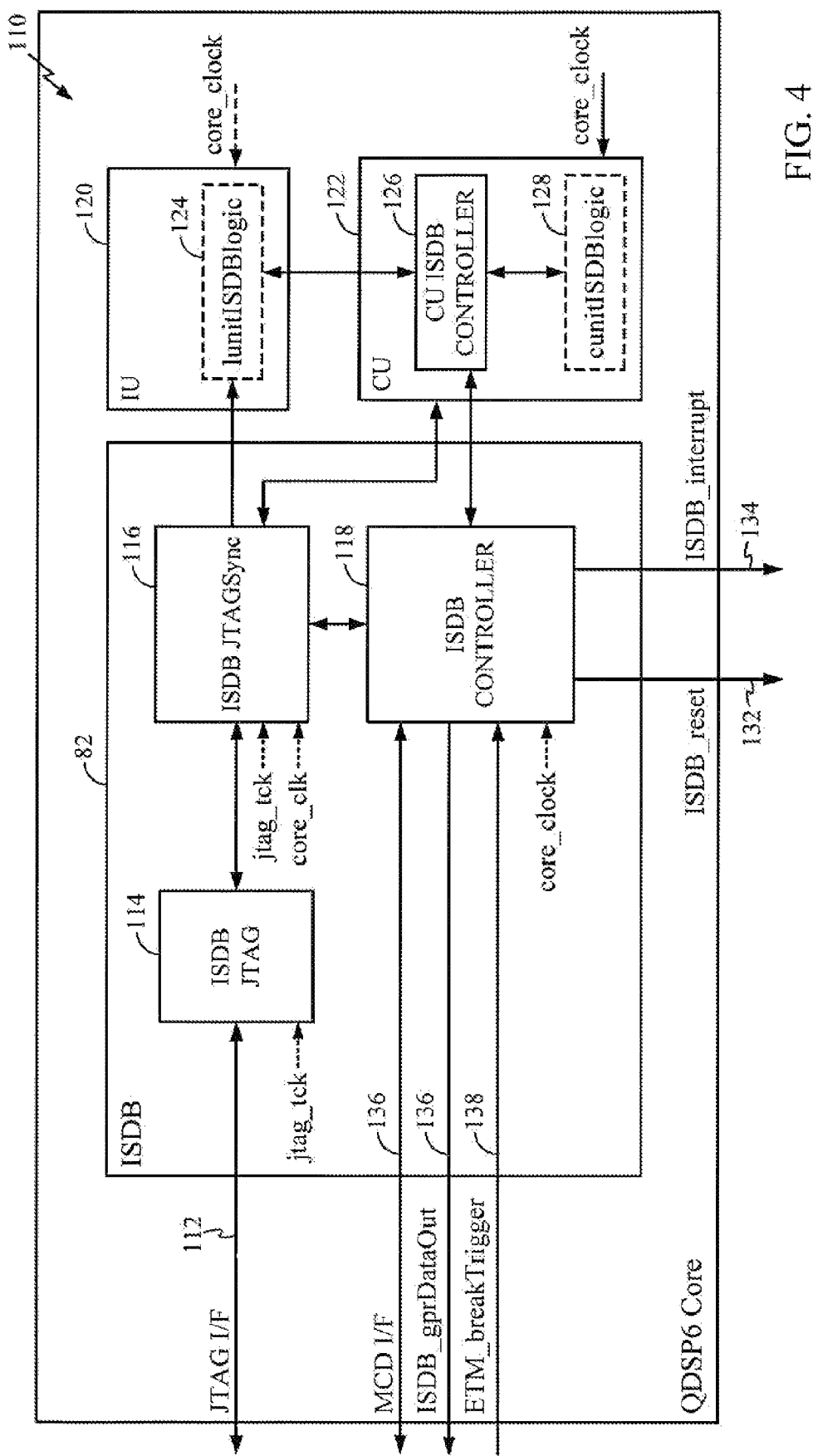
Figure 5:
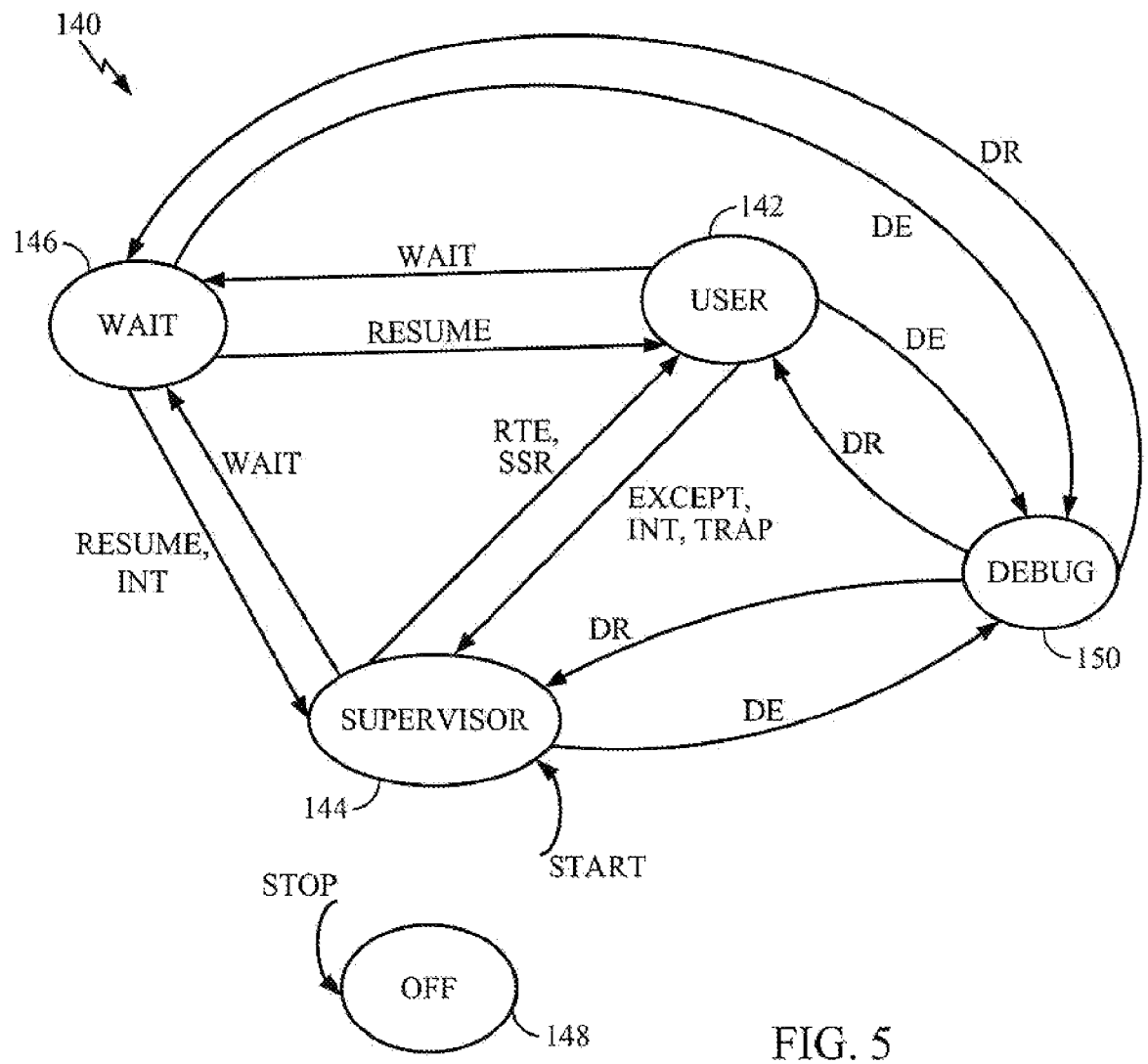
Figure 6:
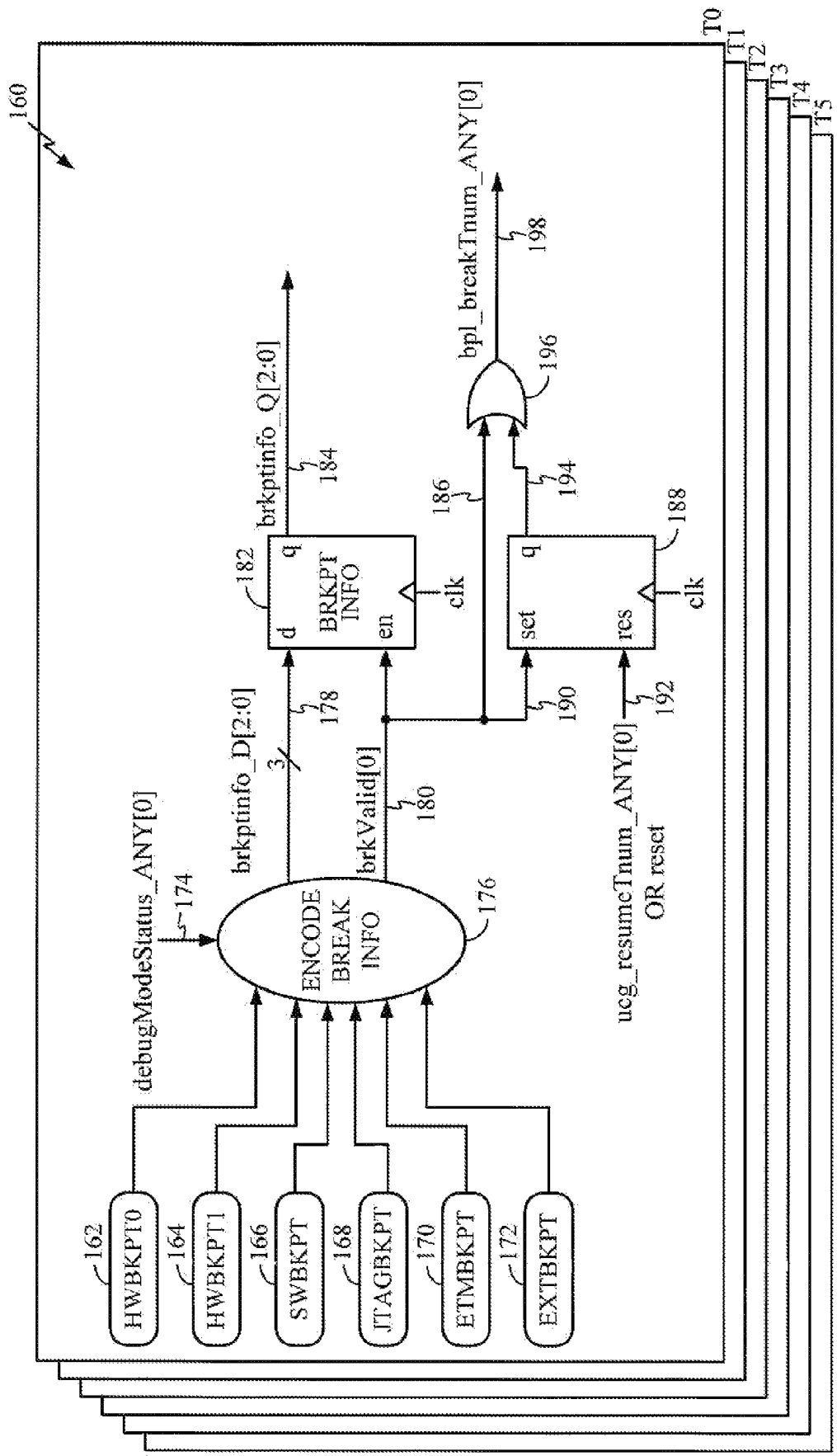
Figure 7:
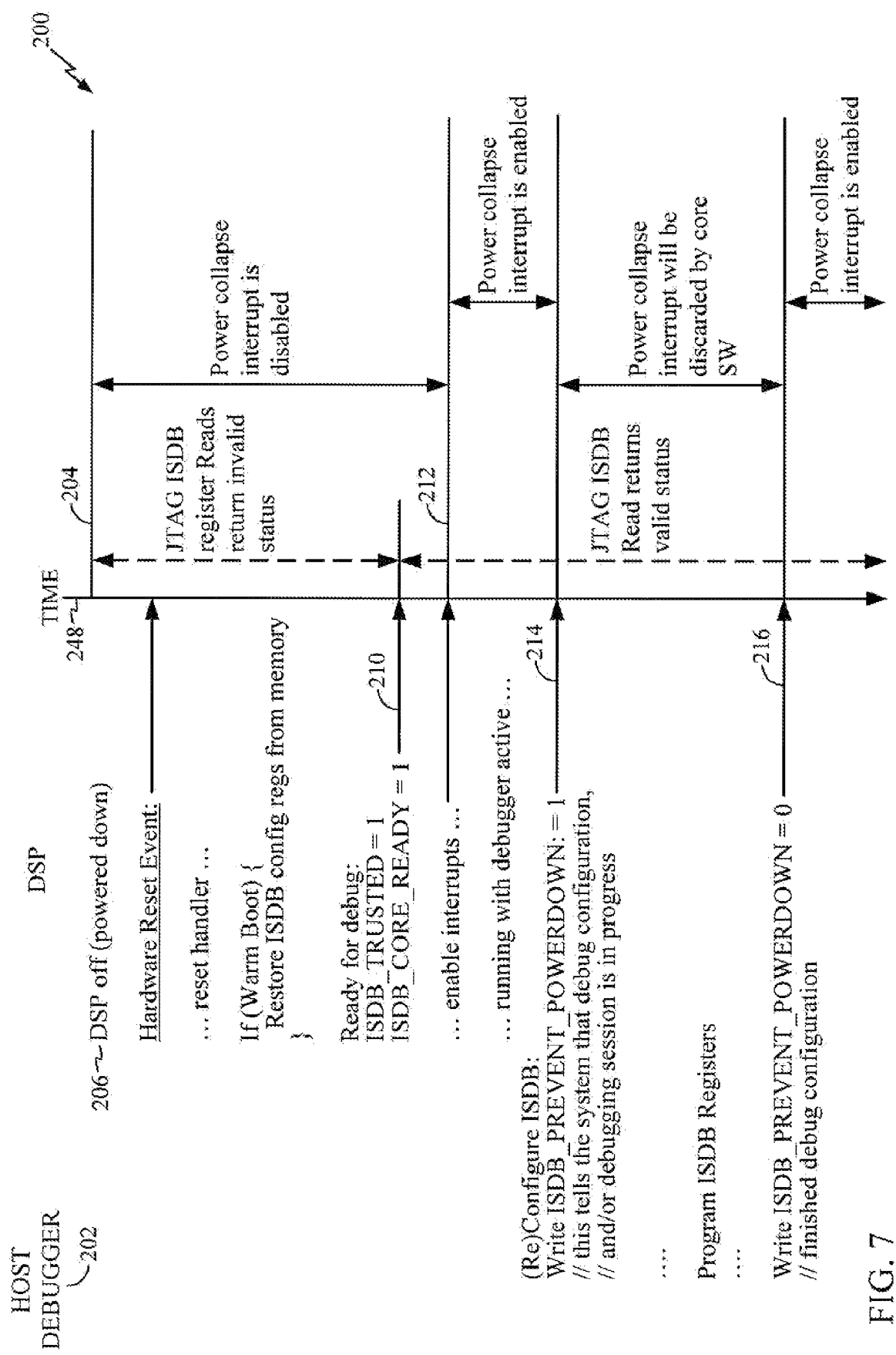
Figure 8:
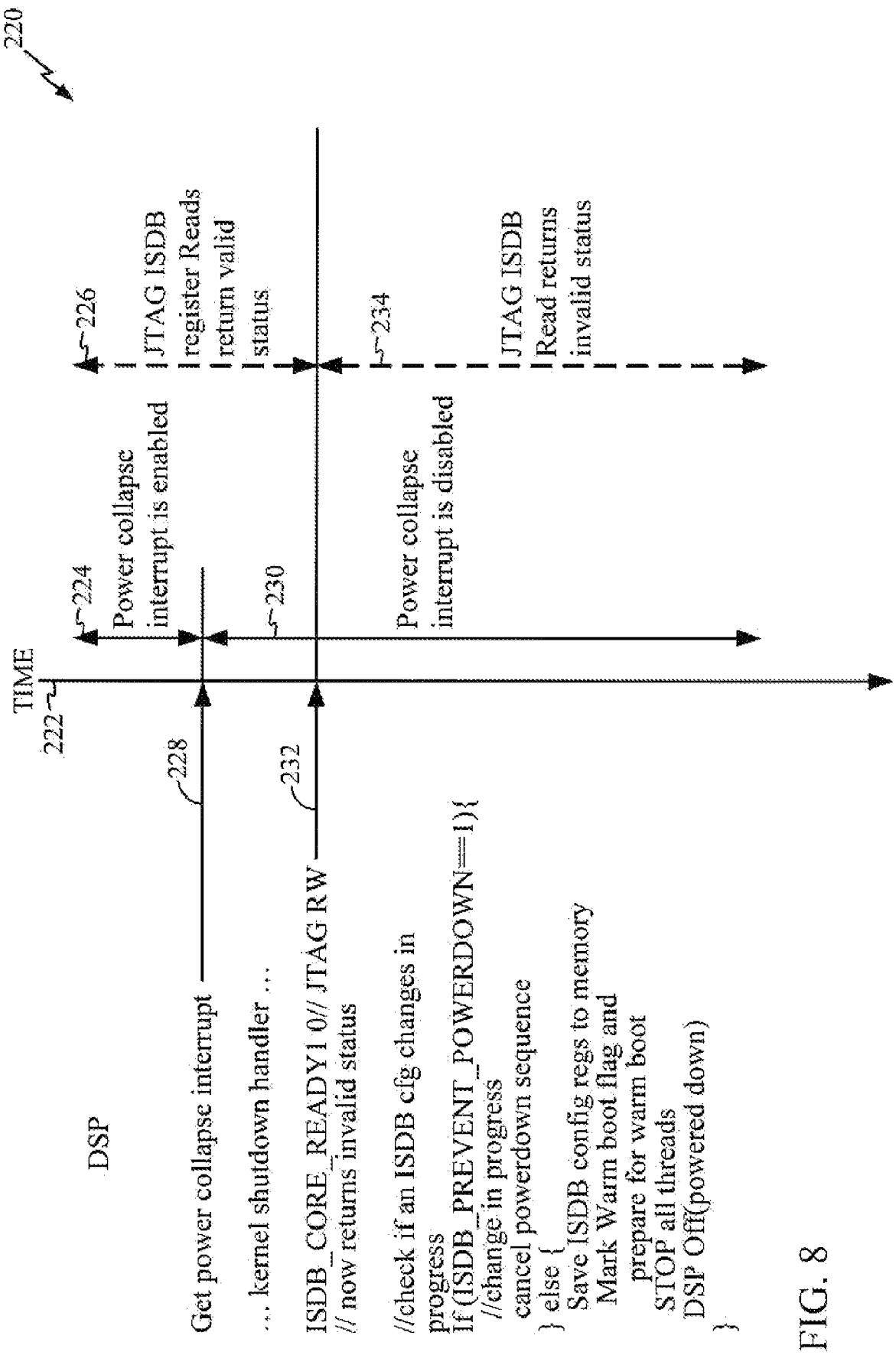

FIG. 3 provides an architecture block diagram of one embodiment of a digital signal processor providing the technical advantages of the disclosed subject matter;

FIG. 4 shows the interface between the debugging mechanism and the core processor of the disclosed subject matter;

FIG. 5 a process flow diagram applicable to the operating modes of the digital signal processor, including the debugging mode of operation;

FIG. 6 depicts a breakpoint processing scheme applicable to one embodiment of the present disclosure;

FIG. 7 shows operation of the disclosed subject matter during a power-up transition; and FIG. 8 illustrates operation of the disclosed subject matter in the instance of a power-down transition.

DETAILED DESCRIPTION OF THE SPECIFIC EMBODIMENTS

Figure 1:
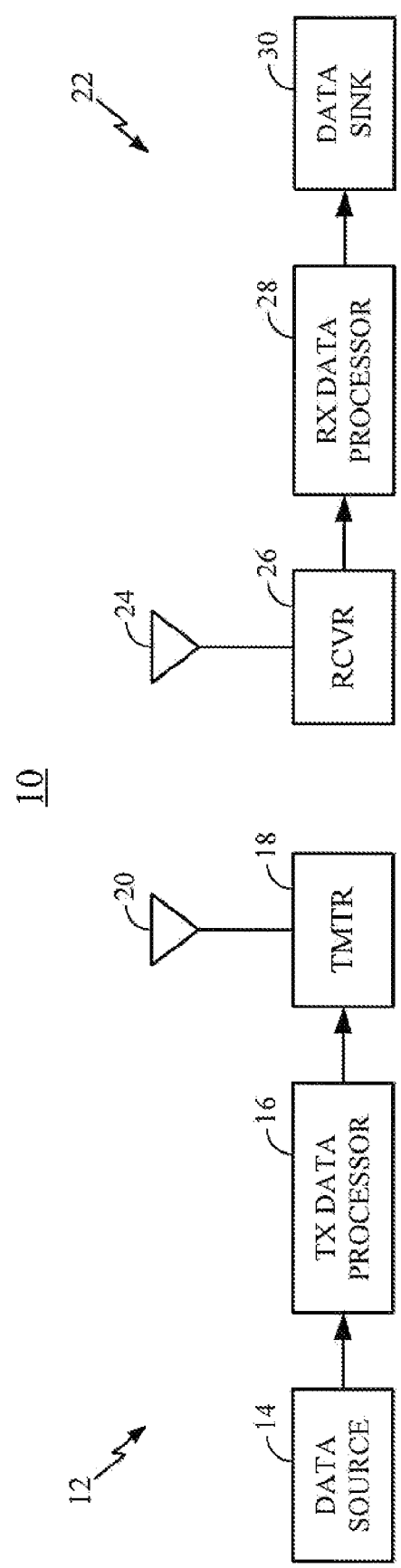
FIG. 1 is a simplified block diagram of a communications system that may implement the present embodiment.

The disclosed subject matter for controlling debugging operations during digital signal processor power transitions in a multi-threaded digital signal processor has application for multi-threaded processing of any type for which the benefits here presented may be advantageous. One such application appears in telecommunications and, in particular, in wireless handsets that employ one or more digital signal processing circuits. For explaining how such a wireless handset may be used, FIG. 1 provides a simplified block diagram of a communications system 10 that may implement the presented embodiments of the disclosed interrupt processing method and system. At a transmitter unit 12, data is sent, typically in blocks, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by a receive (RX) data processor 28 to recover the transmitted data. The decoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is pot shown in FIG. 1 for simplicity. Communications system 10 may be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA Standard.

Figure 2:
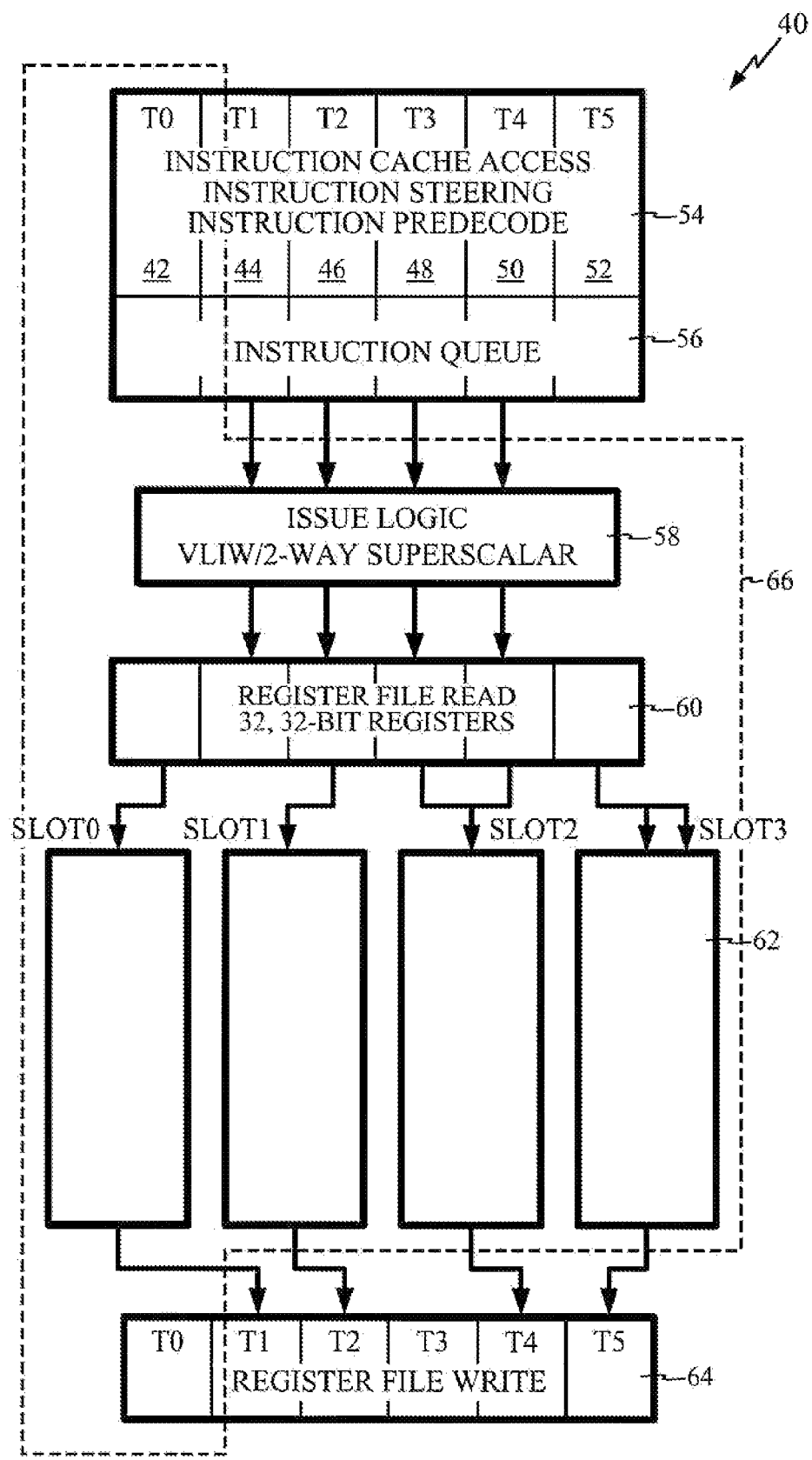
FIG. 2 illustrates a DSP architecture for carrying forth the teachings of the present embodiment.

FIG. 2 illustrates DSP 40 architecture that may serve as the transmit data processor 16 and receive data processor 28 of FIG. 1. We emphasize that DSP 40 only represents one embodiment among a great many of possible digital signal processor embodiments that may effectively use the teachings and concepts here presented. In DSP 40, therefore, threads T0:T5 (reference numerals 42 through 52), contain sets of instructions from, different threads. Circuit 54 represents the instruction access mechanism and is used for fetching instructions for threads T0:T5. Instructions for circuit 54 are queued into instruction queue 56. Instructions in instruction queue 56 are ready to be issued into processor pipeline 66 (see below). From instruction queue 56, a single thread, e.g., thread T0, may be selected by issue logic circuit 58. Register file 60 of a selected thread is read and read data is sent to execution data paths 62 for SLOT0:SLOT3. SLOT0:SLOT3, in this example, provide for the packet grouping combination employed in the present embodiment.

Output from execution data paths 62 goes to register file write circuit 64, also configured to accommodate individual threads T0:T5, for returning the results from the operations of DSP 40. Thus, the data path from circuit 54 and before to register file write circuit 64 forms a processing pipeline 66. The present embodiment may employ a hybrid of a heterogeneous element processor (HEP) system using a single processor with up to six threads, T0:T5. Processor pipeline 66 has six stages, matching the minimum number of processor cycles necessary to fetch a data item from circuit 54 to registers 60 and 64. DSP 40 concurrently executes instructions of different threads T0:T5 within a processor pipeline 66. That is, DSP 40 provides six independent program counters, an internal tagging mechanism to distinguish instructions of threads T0:T5 within processor pipeline 66, and a mechanism that triggers a thread switch. Thread-switch overhead varies from zero to only a few cycles.

DSP 40, therefore, provides a general-purpose digital signal processor designed for high-performance and tow-power across a wide variety of signal, image, and video processing applications. FIG. 3 provides a brief overview of the DSP 40 architecture, including some aspects of the associated instruction set architecture for one manifestation of the disclosed subject matter. Implementations of the DSP 40 architecture support interleaved multithreading (IMT). In this execution model, the hardware supports concurrent execution of multiple hardware threads T0:T5 by interleaving instructions from different threads in the pipeline. This feature allows DSP 40 to include an aggressive clock frequency while still maintaining high core and memory utilization. IMT provides high throughput without the need for expensive compensation mechanisms such as out-of-order execution, extensive forwarding networks, and so on. Moreover, the DSP 40 may include variations of IMT, such as those variations and novel approaches disclosed in the commonly-assigned U.S. Patent Applications by M. Ahmed, et al, and entitled "Variable Interleaved Multithreaded Processor Method and System" and "Method and System for Variable Thread Allocation and Switching in a Multithreaded Processor."

FIG. 3, in particular, provides a core processing architecture 70 block diagram for DSP 40 as applied to a single thread that may employ the teachings of the disclosed subject matter. Block diagram 70 depicts shared instruction cache 72 which receives instructions via Bus interface (I/F) 73 from AXI Bus 74, which instructions include mixed 16-bit and 32-bit instructions. These instructions reach to sequencer 76, user control register 78, and supervisor control register 80 of threads T0:T5. The core-level system architecture of the disclosed subject matter also includes in-silicon debugging system (ISDB) 82, which interfaces core processor 70 via JTAG interface 84, both of which are described in more detail below.

Sequencer 76 provides hybrid two-way superscalar instructions and four-way VLIW instructions to S-Pipe unit 86, M-Pipe unit 88, LD[Load]-Pipe 90, and LD/ST[Store]-Pipe unit 92, all of which communicate with general registers 94. AXI Bus 74 also communicates via Bus I/F 73 with shared data cache 96 LD/ST instructions to threads T0:T5. Optional L2 Cache/TCM 98 signals include LD/ST instructions with shared data TCM 100, which LD/ST instructions further flow to threads General Registers 94. From AHB peripheral bus 102 MSM specific controller 104 communicates interrupts with T0:T5, including interrupt controller instructions, debugging instructions, and timing instructions. Global control registers 106 communicates control register instructions with threads T0:T5.

DSP 40, therefore, includes six virtual DSP cores, each containing global control registers 106 and private supervisor control registers 80. Global control registers 106 are shared between all threads. Each thread shares a common data cache and a common instruction cache. Load, store, and fetch operations are serviced by a common bus interface. High performance AXI bus 74 and a lower performance AHB bus 102 are used to connect the data and instruction traffic to off-core memory and peripherals. An integrated level two memory (cache and/or TCM) input 98 is optional. Peripheral access may be through memory-mapped loads and stores. The physical address partition between AHB and AXI may be configured at the MSM level.

Clearly, the presented architecture for DSP 40 may evolve and change over time. For example, the number of instruction caches that DSP 40 may use could change from six to one, or other numbers of caches. Superscalar dispatch, L1 data at TCM 100, and other architectural aspects may change. However, the present subject matter may have continued relevance in a wide variety of configurations and for a large family of modifications of DSP 40.

ISDB 82, through JTAG interface 84, provides a hardware debugger for DSP 40. ISDB 82 provides software debug features through JTAG interface 84 by sharing system or supervisor-only registers, that are divided into supervisor control registers 80 on a per thread basis, and global control registers 106 between all threads. The system control registers are used for per thread interrupt and exception control and per thread memory management activities. Global registers allow interacting with the ISDB 82 for debugging operations.

ISDB 82 enables software developers to debug their software while DSP 40 operates. ISDB 82 hardware, in combination with a software debugger program operating in ISDB 82, may be used to debug the DSP 40 operating system software. ISDB 82 supports debugging hardware threads individually. Users may suspend thread execution, view and alter thread registers, view and alter instruction and data memory, single step threads, stuff instructions to threads, and resume thread execution. Trusted users have access to all of ISDB 82 features, while un-trusted users have access to a subset of features.

ISDB 82 may interface with a debugger interface card to communicating with ISDB 82 debugging software residing on a program counter, yet all through JTAG interface 84. Host debugger software may interact with the ISDB 82 by reading and writing ISDB control registers. Communication, for example, may be through a 40-bit packet which identifies the ISDB register to which read/write is to occur, as well as a 32-bit data payload. A packet format supporting this operation may be up to 64 control registers which may be 32 bits wide each.

ISDB 82 includes a trusted register for controlling security during a debugging operation. If the ISDB 82 trusted is set, then all ISDB 82 registers are visible to the debugger software, and all ISDB commands are available for use. In the case that ISDB trusted is cleared, then ISDB 82 only permits a restricted set of operations.

Certain ISDB 82 registers may be made visible to core software. These are accessible via SUPERVISOR mode control register transfer instructions. The core instructions include a breakpoint instruction. When ISDB trusted is set, this instruction causes the executing thread to enter a debugging operational mode. This transition shifts thread control to ISDB 82. In addition to the thread that executed a breakpoint, other threads may optionally enter DEBUG mode 150 according to ISDB 82 programming. If ISDB 82 is not trusted or not enabled, this instruction is treated as a NOP. Preferably, the breakpoint instruction, is the only instruction in a packet.

FIG. 4 shows the interface 110 between the debugging mechanism and the core processor of the disclosed subject matter, as may be applicable to enable the present subject matter for con toiling debugging operations during digital signal processor power transitions. In association with DSP 40 core architecture 70, ISDB 82 communicates with JTAG 84 via path JTAG interface path 110, from ISDB JTAG circuit 114. ISDB JTAG circuit 114 processes data flows between JTAG 84 and ISDB 83. ISDB JTAG circuit 114 further interfaces ISDB JTAGSync circuit 116. ISDB JTAGSync circuit 116 communicates further with ISDB controller 118, IU 150 and CU 122. Particularly, ISDB JTAGSync circuit 116 interfaces IU ISDB logic circuit of IU 150 and CU ISDB Controller 126 of CD 122. CU ISDB controller 126 communicates with CU ISDB logic circuit 128, as well as ISDB controller 118. Control outputs from ISDB controller 118 include ISDB data output 130, ISDB reset signal 132, and ISDB interrupt 134. Further interfaces to ISDB controller 118 include MCD interface 136 and ETM break trigger 138.

Having listed the various components of ISDB 82 what follows are an operational description, as well as a brief introduction of the constituent parts of the control or logic circuitry for performing non-intrusive, debugging operations in association with the operation of DSP 40. In particular, and although not shown in detail, CU 122 includes three principle circuits. These include the circuitry and instructions capable of handling the tasks (a) processing breakpoints and generating break triggers to each thread; (b) generating micro-break and micro-resume commands; (c) maintaining ISDB 82 status and mailbox registers; and (d) implementing the certain ISDB 82 registers. CU 122 includes three sub-blocks of a breakpoint processing logic (BPL) block as appears in FIG. 6, below, a mailbox and status logic and a micro-command generator. The BPL block processes all the breakpoints and generates a macro break request to the micro-command generator of CU ISDB controller 126. The micro-command generator processes the macro break request along with instruction stuff commands, instruction step and resume commands and issues micro-break and resume commands to CU 122 for pipeline control.

CU ISDB controller 128 maintains the state of ISDB 82 based on the break and resume acknowledge signals received back. The mailbox functions of CU ISDB controller 126 maintain mailbox registers used for communication between the host debug software and the DSP 40 core processor. These mailbox functions also contain ISDB 82 status registers.

FIG. 6 details the various breakpoint triggers of the disclosed subject matter as may occur during a debugging operation of DSP 40. However, prior to establishing an appreciation of the specific debugging operation breakpoints, an understanding of the various modes with which the presently disclosed non-intrusive debugging operations cooperate is relevant. Accordingly, FIG. 5 presents a processing mode diagram 140 for the various mode control aspects of DSP 40, including operations of ISDB 82 during debugging processes.

In FIG. 5, DSP 40 supports processing modes that are both global to all threads and local to individual threads. Each DSP 40 hardware thread individually supports two execution modes, USER mode 142 and SUPERVISOR mode 144, and three non-processing modes o WAIT mode 146, OFF mode 148, and DEBUG mode 150, all as may appear in FIG. 5. The mode of a thread is independent of other threads, for example one thread may be in WAIT mode 146 while another is in USER mode 142, and so on.

The per-thread mode state diagram of FIG. 5 is supported by various instructions or events. These include "Except" or internal exception event, an "Int" or external interrupt event, an "RTE" or software return instruction from exception mode, and "SSR" or update to SSR register instruction, a "Stop" or software stop instruction that may be entered from any mode, a "Start" or software Start Instruction that also may be entered from any mode, a "trap" or software Trap Instruction, a "Wait" or software wait Instruction, a "Resume" or software Resume Instruction, a "DE" or Debug Event, and a "DR" or Debug Instruction. While the functions in different implementations of the claimed subject matter may vary slightly from those here presented, the meanings of "Start," "Wait," "Resume," "DE," and/or "DR" may be given their broadest interpretations consistent with the scope of me claimed subject matter.

Registers are available in DSP 40 in both USER mode 142 and SUPERVISOR mode 144. The user-mode registers are divided into a set of general registers and a set of control registers. General registers are used for all general purpose computation including address generation, scalar and vector arithmetic. Control registers support special-purpose functionality such as hardware loops, predicates, etc. General purpose registers are 32 bits wide and may be accessed as single registers or as aligned pairs of two registers. The general register file provides all operands for instructions, including addresses for load/store, data operands for numeric instructions, and vector operands for vector instructions.

DEBUG mode 150 provides a Special state where the thread is waiting for commands from ISDB 82. Whenever an ISDB Debug Event occurs, such as by the execution of a software breakpoint instruction, a break command from ISDB 82, or occurrence of a hardware breakpoint, indicated threads may enter DEBUG mode 150. While in DEBUG mode 150, the core is controlled by ISDB 82 via commands from JTAG interface 84. When the ISDB 82 releases the thread due to execution of a resume command, the thread may resume operation according to their current mode settings. When a thread is in DEBUG mode 150, it is controlled by ISDB 82 and cannot be controlled by other threads. A Wait, Resume, Start, or Stop instruction from a running thread, targeting a thread in DEBUG mode 150, may be ignored. Similarly, a Non-Maskable Interrupt (NMI) may be ignored by threads in DEBUG mode 150.

A HARDWARE RESET mode (not shown) and DEBUG mode 150 are global to all threads. Whenever the hardware reset pin is asserted, regardless of any thread's processing state, DSP 40 may enter HARDWARE RESET Mode. In RESET mode, all registers are set to their reset values. No processing may occur until the hardware reset pin is de-asserted. When the reset pin is asserted, the processor may transition into reset mode and all registers may be reset to their reset values. After fee reset pin is de-asserted, thread T0 may be given a soft reset interrupt. This may cause thread T0 to enter SUPERVISOR mode 144 and begin executing at the reset vector location. All other threads may remain off. At this point, the software is free to control mode transitions for each thread individually.

Turning now to FIG. 6, it is seen that BPL 160 includes break triggers from six different sources, including hardware breakpoints 0/1 (HKWBKPT0 162 and HWBKPT1 164), software breakpoint (SWBKPT 166), JTAG 84 breakpoint (JTAGBKPT 168), ETM (embedded trace macro) breakpoint (ETMBKPT 170), and external breakpoint (EXTBKFT 172). Break trigger 162 through 172 and debug mode status input 174 go to encode break encoder 176 to cause DSP 40 to operate in DEBUG mode 150. Output from encoder 176 includes three (3) breakpoint information bits 178 and a breakpoint valid bit 180. Breakpoint information data 178 enters breakpoint information circuit 182 to cause a breakpoint information JTAG interface command 184. Breakpoint bit 180 also generates OR gate input 186 and reset circuit 188 input. Reset circuit 188 receives either a UCG resume thread number or a reset input 192 to generate reset control output 194 into OR gate 196. Either valid bit 186 or reset output 194 may cause OR gate 196 to generate BPL 160 breakpoint output 198.

The break triggers in BPL circuit 160 are processed along with the corresponding TNUM mask to generate macro break trigger to each of the threads. The macro break trigger 198, bpl_breakTnum_ANY[5:0], is maintained until the corresponding thread is resumed. The number of pipeline stages that can be used in BPL 160 is driven by hardware breakpoints which are precise breakpoints, i.e., the instruction that triggers hardware breakpoint match must not be executed. The thread switches to debug mode after executing the program until that instruction. The disclosed embodiment provides a macro break trigger one cycle after the break triggers arrive. For that reason the breakValid input 176 is logically OR'ed with its latched version input 192 to generate bpl_breakTnum_ANY output 198.

Through the use of breakpoints, the six threads of DSP 40 may individually enter and exit DEBUG mode 150. A breakpoint trigger may come from five sources which correspond to the five different types of breakpoints supported in ISDB 82. Upon hitting a breakpoint, a thread transitions from its current mode (e.g., WAIT/RUN) to DEBUG mode 150. In DEBUG mode 150, the thread waits for commands from ISDB 82. A thread in OFF mode 148 is powered down and may not accept any commands from ISDB 82. The latency of entering DEBUG mode 150 is implementation defined, such as in the present disclosure as relating to the event a power collapse. For example, an implementation may choose to complete a given operation, for example finish an outstanding load request, before entering DEBUG mode 150. In one embodiment, a thread identifier register contains an 8-bit read/write field and is used for holding a software thread identifier. This field is used by the hardware debugger to match breakpoints.

There are a number of different ways to enter a breakpoint process. For example, there are two hardware breakpoints. In a register equals a predetermined value, then when the program counter (PC) matches the predetermined value, then the process goes into the DEBUG mode 150. ASIDs (Address Space Identifiers) are tags that are similar to process IDs in a process or a particular thread in a multithreaded process. So, physical address, virtual address, ASID, PC, or other qualifiers may be used to optionally obtain a fix of the location of the program in a space at which point a breakpoint may occur.

The uses of breakpoints here referenced are more particularly disclosed in the commonly-assigned U.S. Patent Applications by L. Codreseu, et al, and entitled NON-INTRUSIVE, THREAD-SELECTIVE, DEBUGGING METHOD AND SYSTEM FOR A MULTI-THREADED DIGITAL SIGNAL PROCESSOR. So, the disclosed subject matter provides a path for moving into a DEBUG mode 150 in the event of a breakpoint causing entry into the DEBUG mode 150. The disclosed subject matter controls which thread or sets of threads in the multi-threaded processor go into the DEBUG mode 150. Through the use of breakpoints and the associated debugging algorithms, non-intrusive debugging operations of DSP 40 may occur. Such operations may even occur during various power management schemes as may be programmed with DSP 40.

Another aspect of the disclosed subject matter, therefore, includes performing debugging operations through a power collapse in DSP 40. The ISDB configuration registers are readable and writeable by both the debugger software (via JTAG interface 84) and by supervisor core software (via control register transfer instructions). Kernel software may use this feature to save and restore the ISDB 82 configuration over a power collapse. Because in such instance there are multiple masters writing these shared registers, it is important to only write to such debugging registers in a consistent and mutually exclusive fashion.

The disclosed subject matter provides that the DSP 40 core processor may be in the process of powering down or powering up, during which JTAG interface 84 may not read/write to the debugging configuration registers. Similarly, when JTAG interface 84 is in the process of modifying debugging registers, the DSP 40 core processor is not allowed to power down. This policy is enforced through a combination of hardware and software. An ISDB core ready register bit may be written only by core supervisor software. This bit is cleared on hardware reset of DSP 40. When the bit is clear, all JTAG interface 84 read and write packets may return an invalid status. Using this bit, the core may indicate to the host software when it has completed the power up sequence and is ready to talk to the ISDB. This gives the core an opportunity to restore any saved ISDB 82 configuration in warm boot power up (restore) sequences.

One example of debugging through power collapse may exist in a cell phone, where there is the need to be power conscious. DSP 40 may go off or idle while there is yet the need to perform debugging. The disclosed subject matter, therefore, provides the ability to set a breakpoint that may manifest itself only in the power collapse instance. This provides the ability to debug, even when the core is not even operating or "on."

Debugging through a power collapse, in the disclosed embodiment, includes setting a set of breakpoints for configurations associated with DSP 40 dropping power. Before DSP 40 drops power, the existing debugging configurations are saved in debugging configuration registers. These specific registers and configurations allow a "suspend-to-RAM" process. As such, when DSP 40 returns to power, the debugging configuration allows performing the next debug operation.

To illustrate one embodiment of these features, FIG. 7 shows the Warm boot power-up sequence 200 for the process of the disclosed subject matter. In particular, FIG. 1 describes operations occurring at host debugger 202 and DSP 40, all against timeline 204. To begin, DSP 40 may be in powered-down status at step 206 at an initial time 208. At time 208, an external hardware reset event may occur. In response, JTAG 84 controlled ISDB 82 register reads returns an invalid status, thereby preventing a change in the register contents. This presents, therefore, a "prevent-transfer" value to the core processor. Also following step 208, the power collapse interrupt is disabled. Once ISDB 82 is ready for debugging operations, at step 210, the ISDB_TRUSTED register takes a "1" value, as does the ISDB_CORE_READY register. So, "1's" in both of these registers indicate that debugging operations may occur. At step 212, a power collapse interrupt is enabled and may continue to be enabled until, at step 214, the JTAG ISDB read returns a valid status.

At step 214, a power collapse interrupt may be discarded by the core processor. This reflects the status of reconfiguring the ISDB with the write register ISDB_PREVENT_POWERDOWN having a 1 value. This value tells the host debugger system that the DSP is in a debugging configuration and that the debugging session is in progress. During this phase, ISDB programs the ISDB 82 registers. When the debugging, process is no longer changing the ISDB registers, the ISDB_PREVENT_POWERDOWN register obtains a 0 value, indicating that the debugging configuration is stable. Accordingly, at step 116 the power collapse interrupt is enabled.

FIG. 8 shows the warm boot power-down sequence 220 provided by the disclosed embodiment. Warm boot power-down sequence 220 may begin at point 222 at which a power collapse interrupt is enabled (arrow 224). During such period, the JTAG ISDB register may return a Read return valid status (arrow 226). At point 228, a power collapse interrupt may occur, causing a kernel shutdown handler to operate. In response, the power collapse interrupt is disabled (arrow 230). At point 232, the ISDB_CORE_READY register reads 0 and the JTAG read/write returns an invalid status. During the period which arrow 234 covers, the core processor checks to see if an ISDB configuration change is in progress, as indicated by the ISDB_PREVENT_POWERDOWN register having a 1 value. This indicates a change is in progress, causing a canceling of the power-down sequence. If a configuration is not in progress, then the power-down sequence 220 saves the ISDB configuration register contents to memory. A warm boot flag marker is set and preparation, for subsequent warm boot takes place. Then, power-down sequence 200 stops all threads and DSP 40 is powered down.

The disclosed subject matter, therefore, provides a method and system for performing debugging operations during digital signal processor power transition, including a power collapse. The ISDB configuration of DSP 40 is readable and writeable by both the debugger software and by the supervisor core software. Kernel software can use the performance of debugging operations during power collapse to save and restore the configuration existing at the time of a collapse of power. This aspect of debugging provides a reliable and consistent way to capture the ISDB configuration, thereby permitting not only use of the configuration during the power collapse, but also the restoration of the configuration in a subsequent power up sequence.

In summary, the disclosed subject matter provides a method and system for transferring data between debugging registers and digital signal processor processes in association with a power transition sequence of the digital signal processor. In a digital signal processor operating a core processor process within a core processor and a debugging process within a debugging mechanism, the present disclosure associates debugging registers with the core processor process and the debugging process. By establishing at least one register control bit for controlling transferring data among the debugging registers, the core processor process and the debugging process, the method and system set the control bit to a prevent-transfer value that prevents transferring data among the debugging registers, the core processor process and the debugging process in the event of a power transition sequence. By setting the one control bit to prevent a prevent-power-transition value, the present disclosure prevents a power transition sequence of the digital signal processor in the event of transferring data among the debugging registers and the core processor process or the debugging process.

Further aspects of the present disclosure include setting at least one register control bit to a prevent-transfer value for preventing transferring data among the debugging registers and the core processor process and the debugging process in the event of a power-up sequence occurring with the digital signal processor. Also, the present disclose allows setting the at least one register control bit to a prevent-transfer value for preventing transferring data among the debugging registers and the core processor process and the debugging process in the event of a power-down sequence occurring with the digital signal processor; and, furthermore, setting the at least one power control bit to prevent-power-transition value for preventing a power-down sequence of the digital signal processor in the event of transferring data among the debugging registers and the core processor process or the debugging process.

The debugging registers may comprise debugging configuration registers, wherein the present disclosure provides setting the at least one register control bit to a prevent-transfer value for preventing transferring data among the debugging configuration registers and the core processor process and the debugging process in the event of a power transition sequence occurring with the digital signal process, and setting the at least one power control bit to a prevent-power-transition value for preventing a power transition sequence of the digital signal processor in the event of transferring data among the debugging configuration registers and the core processor process or the debugging process. The debugging process may be a trusted or un-trusted debugging process.

In operation, the prevent-transfer value may be an invalid status value and further comprising the step of invalidating read/write transfers among the debugging registers and the core processor process or the debugging process in the event of a power-up sequence of the core processor in response to the invalid status value. The prevent-transfer value may also be an invalid status value and further comprising the step of invalidating read/write transfers among the debugging registers and the core processor process or the debugging process in the event of power-down sequence of the core processor in response to the invalid status value. Furthermore, the prevent-power-transition value comprises an interrupt-disabled value and further comprising the step of disabling a power collapse during read/write transfers among the debugging registers and the core processor process or the debugging process in response to the interrupt-disabled value.

In addition, the present disclosure provides for setting the at least one register control bit to a permit-transfer value for permitting transferring data among the debugging registers and the core processor process and the debugging process following a power-up sequence occurring with the digital signal processor. Also, the present disclosure provides for setting the at least one power control bit to a permit-power-transition value for permitting a power transition sequence of the digital signal processor following the event of transferring data among the debugging registers and the core processor process or the debugging process.

The processing features and functions described herein for non-intrusive, thread-selective, debugging in a multi-threaded digital signal processor may be implemented in various manners. For example, not only may DSP 40 perform the above-described operations, but also the present embodiments may be implemented in an application specific integrated circuit (ASIC), a microcontroller, a digital signal processor, or other electronic circuits designed to perform the functions described herein. Moreover, the process and features here described may be stored in magnetic, optical, or other recording media for reading and execution by such various signal and instruction processing systems. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method comprising:
    associating a plurality of debugging registers with a core processor process and a debugging process;
    selectively setting at least one register control bit within a plurality of debugging registers to a prevent-transfer value for preventing transfer of data with respect to any of the plurality of debugging registers and the debugging process when a power transition sequence occurs within a digital signal processor; and
    setting at least one power control bit associated with the plurality of debugging registers to a prevent-power-transition value for preventing the power transition sequence of the digital signal processor when transferring data with respect to any of the plurality of debugging registers.

2. The method of claim 1, wherein the power transition sequence includes a power-down sequence.

3. The method of claim 1, wherein the debugging registers comprise a plurality of debugging configuration registers.

4. The method of claim 1, wherein the prevent-transfer value comprises an invalid status value and further comprising invalidating read/write transfers with respect to any of the debugging registers and the debugging process in the event of a power-up sequence of the core processor in response to the invalid status value.

5. The method of claim 1, wherein the prevent-transfer value comprises an invalid status value and further comprising invalidating read/write transfers with respect to any of the debugging registers and the debugging process in the event of a power-down sequence of the core processor in response to the invalid status value.

6. The method of claim 1, wherein the prevent-power-transition value comprises an interrupt-disabled value and further comprising disabling a power collapse during read/write transfers with respect to any of the debugging registers in response to the interrupt-disabled value.

7. The method of claim 1, further comprising setting the at least one register control bit to a permit-transfer value for permitting transferring data with respect to any of the plurality of debugging registers and the debugging process following a power-up sequence occurring within the digital signal processor.

8. The method of claim 1, further comprising setting the at least one power control bit to a permit-power-transition value for permitting a power transition sequence of the digital signal processor following an event of transferring data with respect to any of the plurality of debugging registers.

9. The method of claim 1, further comprising saving an existing debugging configuration in the plurality of debugging registers before the power transition sequence occurs.

10. The method of claim 1, wherein the at least one power control bit associated with the plurality of debugging registers is set to the prevent-power-transition value for preventing the power transition sequence of the digital signal processor when transferring data with respect to the plurality of debugging registers and the core processor process.

11. The method of claim 1, wherein the at least one power control bit associated with the plurality of debugging registers is set to the prevent-power-transition value for preventing the power transition sequence of the digital signal processor when transferring data with respect to the plurality of debugging registers and the debugging process.

12. A digital signal processor debugging system comprising:
a plurality of debugging registers associated with a core processor process and a debugging process;
at least one register control bit established within the plurality of debugging registers for controlling transfer of data with respect to any of the plurality of debugging registers and the debugging process,
the at least one register control bit capable of being selectively set to a prevent-transfer value for preventing transfer of data with respect to any of the plurality of debugging registers and the debugging process in the event of a power transition sequence occurring within a digital signal processor; and
at least one power control bit capable of being set to a prevent-power-transition value for preventing the power transition sequence of the digital signal processor in the event of transferring data with respect to any of the plurality of debugging registers.

13. The digital signal processor debugging system of claim 12, wherein the power transition sequence comprises a power-up sequence.

14. The digital signal processor debugging system of claim 12, wherein the power transition sequence comprises a power-down sequence.

15. The digital signal processor debugging system of claim 12, wherein the debugging registers comprise a plurality of debugging configuration registers.

16. The digital signal processor debugging system of claim 12, further comprising a trusted debugging process register for providing at least one trusted debugging control bit in confirming the debugging process to be a trusted debugging process.

17. The digital signal processor debugging system of claim 12, wherein the prevent-transfer value comprises an invalid status value and further comprising circuitry and instructions for invalidating read/write transfers with respect to any of the debugging registers and the debugging process in the event of a power-up sequence of the core processor in response to the invalid status value.

18. The digital signal processor debugging system of claim 12, wherein the prevent-transfer value comprises an invalid status value and further comprising circuitry and instructions for invalidating read/write transfers with respect to any of the debugging registers and the debugging process in the event of power-down sequence of the core processor in response to the invalid status value.

19. The digital signal processor debugging system of claim 12, wherein the prevent-power-transition value comprises an interrupt-disabled value and further comprising circuitry and instructions for disabling a power collapse during read/write transfers with respect to any of the debugging registers in response to the interrupt-disabled value.

20. The digital signal processor debugging system of claim 12, wherein the power transition sequence comprises a power-up sequence occurring within the digital signal processor.

21. The digital signal processor debugging system of claim 12, further comprising instructions and circuitry for setting the at least one power control bit to a permit-power-transition value for permitting a power transition sequence of the digital signal processor following the event of transfer of data with respect to any of the plurality of debugging registers.

22. A digital signal processor comprising:
means for establishing within the plurality of debugging registers at least one register control bit for controlling transfer of data with respect to any of the plurality of debugging registers and a debugging process;
means for selectively setting the at least one register control bit to a prevent-transfer value for preventing transfer of data with respect to any of the plurality of debugging registers and the debugging process in the event of a power transition sequence occurring within the digital signal processor; and
means for setting at least one power control bit to a prevent-power-transition value for preventing a power transition sequence of the digital signal processor in the event of transfer of data with respect to any of the plurality of debugging registers.

23. The digital signal processor system of claim 22, wherein the power transition sequence comprises a power-up sequence occurring within the digital signal processor.

24. The digital signal processor system of claim 22, wherein the power transition sequence comprises a power-down sequence within the digital signal processor.

25. The digital signal processor system of claim 22, wherein the debugging registers comprise a plurality of debugging configuration registers.

26. The digital signal processor system of claim 22, further comprising means for confirming the debugging process to be a trusted debugging process.

27. The digital signal processor system of claim 22, wherein the prevent-transfer value comprises an invalid status value and further comprising means for invalidating read/write transfers with respect to any of the debugging registers and the debugging process in the event of a power-up sequence in response to the invalid status value.

28. The digital signal processor system of claim 22, wherein the prevent-transfer value comprises an invalid status value and further comprising means for invalidating read/write transfers with respect to any of the debugging registers and the debugging process in the event of a power-down sequence of a core processor in response to the invalid status value.

29. The digital signal processor system of claim 22, wherein the prevent-power-transition value comprises an interrupt-disabled value and further comprising means for disabling a power collapse during read/write transfers with respect to any of the debugging registers in response to the interrupt-disabled value.

30. The digital signal processor system of claim 22, further comprising means for setting the at least one register control bit to a permit-power-transition value for permitting a power transition sequence of the digital signal processor following an event of transfer of data with respect to any of the plurality of debugging registers.

31. A computer usable medium having computer readable program code means embodied therein for processing instructions on a digital signal processor, the computer usable medium comprising:
  computer readable program code means for associating a plurality of debugging registers with a core processor process and a debugging process;
  computer readable program code means for establishing within the plurality of debugging registers at least one register control bit for controlling transfer of data with respect to any of the plurality of debugging registers and the debugging process;
  computer readable program code means for selectively setting the at least one register control bit to a prevent-transfer value for preventing transfer of data with respect to any of the plurality of debugging registers and the debugging process in the event of a power transition sequence occurring within the digital signal processor; and
  computer readable program code means for setting at least one power control bit to a prevent-power-transition value for preventing a power transition sequence of the digital signal processor in the event of transfer of data with respect to any of the plurality of debugging registers.

32. The computer usable medium of claim 31, wherein the power transition sequence includes a power-down sequence occurring within the digital signal processor.

* * * * *

UNITED STATES PATENT AND TRADEMARK OFFICE
CERTIFICATE OF CORRECTION

PATENT NO.       : 7,657,791 B2                                            Page 1 of 1
APPLICATION NO. : 11/560323
DATED            : February 2, 2010
INVENTOR(S)      : Codrescu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 434 days.

Signed and Sealed this

Twenty-eighth Day of December, 2010

David J. Kappos
*Director of the United States Patent and Trademark Office*